US011573831B2

(12) United States Patent
Li et al.

(10) Patent No.: US 11,573,831 B2
(45) Date of Patent: Feb. 7, 2023

(54) OPTIMIZING RESOURCE USAGE IN DISTRIBUTED COMPUTING ENVIRONMENTS BY DYNAMICALLY ADJUSTING RESOURCE UNIT SIZE

(71) Applicant: INTERNATIONAL BUSINESS MACHINES CORPORATION, Armonk, NY (US)

(72) Inventors: Xiao Jie Li, Beijing (CN); Zhimin Lin, Scarborough (CA); Jinming Lv, Xi'An (CN); Guang Han Sui, Beijing (CN); Hao Zhou, Toronto (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 344 days.

(21) Appl. No.: 15/627,660

(22) Filed: Jun. 20, 2017

(65) Prior Publication Data
US 2018/0365072 A1 Dec. 20, 2018

(51) Int. Cl.
*G06F 9/50* (2006.01)
*G06F 9/48* (2006.01)

(52) U.S. Cl.
CPC .......... *G06F 9/5038* (2013.01); *G06F 9/4881* (2013.01); *G06F 9/5011* (2013.01)

(58) Field of Classification Search
CPC .............................. G06F 9/4881; G06F 9/5038
See application file for complete search history.

(56) References Cited

U.S. PATENT DOCUMENTS

| 5,838,968 | A   | * | 11/1998 | Culbert    | G06F 9/5011 |
|           |     |   |         |            | 718/103 |
| 8,464,255 | B2  | * | 6/2013  | Nathuji    | G06F 9/5077 |
|           |     |   |         |            | 718/1 |
| 8,521,173 | B2  |   | 8/2013  | Zhang et al. | |
| 8,706,798 | B1  | * | 4/2014  | Suchter    | H04L 43/08 |
|           |     |   |         |            | 709/224 |
| 8,813,085 | B2  | * | 8/2014  | Glew       | G06F 9/4881 |
|           |     |   |         |            | 718/103 |
| 9,363,197 | B2  |   | 6/2016  | Waldspurger | |
| 9,400,682 | B2  |   | 7/2016  | Persikov et al. | |
| 10,534,655 | B1 | * | 1/2020  | Kinney, Jr. | G06F 9/5027 |
| 2005/0010608 | A1 | * | 1/2005  | Horikawa   | G06F 9/4862 |
| 2005/0192750 | A1 | * | 9/2005  | MacLellan  | G05B 19/41865 |
|           |     |   |         |            | 702/1 |
| 2008/0244601 | A1 | * | 10/2008 | Zeis       | G06F 9/5011 |
|           |     |   |         |            | 718/104 |

(Continued)

FOREIGN PATENT DOCUMENTS

CN 201310572431 A 11/2013
CN 201510297019 A 6/2015

*Primary Examiner* — Meng Ai T An
*Assistant Examiner* — Willy W Huaracha
(74) *Attorney, Agent, or Firm* — Griffiths & Seaton PLLC

(57) ABSTRACT

Embodiments for optimizing resource usage in a distributed computing environment. Resource usage of each task in a set of running tasks associated with a job is monitored to collect resource usage information corresponding to each respective task. A resource unit size of at least one resource allocated to respective tasks in the set of running tasks is adjusted based on the resource usage information to improve overall resource usage in the distributed computing environment.

21 Claims, 6 Drawing Sheets

(56) References Cited

U.S. PATENT DOCUMENTS

| | | | |
|---|---|---|---|
| 2010/0325381 A1* | 12/2010 | Heim | G06F 9/455 |
| | | | 711/170 |
| 2013/0346614 A1 | 12/2013 | Baughman et al. | |
| 2015/0089511 A1* | 3/2015 | Smith | G06F 17/5009 |
| | | | 718/104 |
| 2015/0199216 A1* | 7/2015 | Cao | G06F 9/5027 |
| | | | 718/104 |
| 2015/0199218 A1* | 7/2015 | Wilson | G06F 9/4881 |
| | | | 718/104 |
| 2016/0373370 A1* | 12/2016 | Suchter | G06F 9/5038 |
| 2017/0039236 A1* | 2/2017 | Li | G06F 9/5044 |

* cited by examiner

OPTIMIZING RESOURCE USAGE IN DISTRIBUTED COMPUTING ENVIRONMENTS BY DYNAMICALLY ADJUSTING RESOURCE UNIT SIZE

BACKGROUND OF THE INVENTION

Field of the Invention

The present invention relates in general to computing systems, and more particularly to, various embodiments for optimizing resource usage within and/or between distributed computing components.

Description of the Related Art

In today's society, computer systems are commonplace. Computer systems may be found in the workplace, at home, or at school. As computer systems become increasingly relied upon, convenient, and portable, the Internet has grown exponentially. Now, more than ever before, individuals and businesses rely upon distributed storage systems (commonly referred to as "the cloud") to store information and data. As wide strides in technological advancement relating to data access devices have been accomplished, there is an ever-growing demand for growth and development within the back end supporting systems that provide and store the data content.

SUMMARY OF THE INVENTION

A computer cluster, referred to as cluster for short, is a type of computer system which completes computing jobs by means of multiple collaborative computers (also known as computing resources such as software and/or hardware resources) which are connected together. These computing resources which are in a same management domain have a unified management policy and provide services to users as a whole. A single computer in a cluster system is usually called a node or a computing node.

The cluster system has many advantages. For example, the cluster system, when working in a load-balance manner, can achieve a higher efficiency through performing a same work by multiple computers. The cluster system may also work in a master/slave server manner. Once a master server fails, a slave server can provide services to users in substitute of the master server, thereby exhibiting a high fault-tolerance.

When scheduling a job, corresponding computing resources are allocated to the job to be implemented. This process is referred to as job scheduling in a cluster environment. The job scheduling is actually a process for mapping jobs to corresponding resources for execution based on characteristics of the jobs, and resources according to scheduling policies.

In brief, the computing jobs are requesting resources and utilizing them. Traditional computing jobs are mainly related to high performance computing applications such as weather forecast, landform analysis and other similar large-scale science issues. Along with the pervasions of computer techniques in various fields, computations are increasingly demanded in some new fields such as on-line gaming, banking business, electronic design automation, and so on.

When actually running, different applications have different requirements for resources, and even the same application may have different resource requirements in different execution phases. For example, a complete process of weather forecast application generally comprises pre-processing on raw data, subsequent calculations, and some data post-processing. In the data pre-processing phase, the requirement for resources usually concentrates on I/O performance. In the computing phase, the requirement for resources focuses on computational performance.

Thus, for a job with many tasks (or phases), the job will request resources from the resource scheduler of the cluster, and run the tasks on the resources allocated to the job by the scheduling manager of the cluster. When requesting resources, the resource requirement for tasks within the same job is equal for all tasks. The resource requirement consists of a resource unit (e.g., 1 central processing unit (CPU) and 2 gigabytes (GB) of memory), and the number of resource units needed. The resource scheduler or scheduling manager will then allocate some or all of the requested resource units to the job for executing the tasks. However, this resource unit is currently to be specified by the user, and as aforementioned, when executing, different applications have different resource requirements and some applications have differing resource requirements for various tasks or phases of the job. Hence, it is difficult for the user to determine an accurate value of resource units to specify for executing the job to the resource scheduler, as even small discrepancies in resource units specified by the user as opposed to what resources (and number of resource units thereof) are actually needed/used by the job can create bottlenecks or resource wastage in the system.

Accordingly and to improve upon the art, various embodiments are disclosed herein for optimizing resource usage in a distributed computing environment, by a processor device. In one embodiment, by way of example only, a method comprises monitoring resource usage of each task in a set of running tasks associated with a job to collect resource usage information corresponding to each respective task; and dynamically adjusting a resource unit size of at least one resource allocated to respective tasks in the set of running tasks based on the resource usage information to improve overall resource usage in the distributed computing environment.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
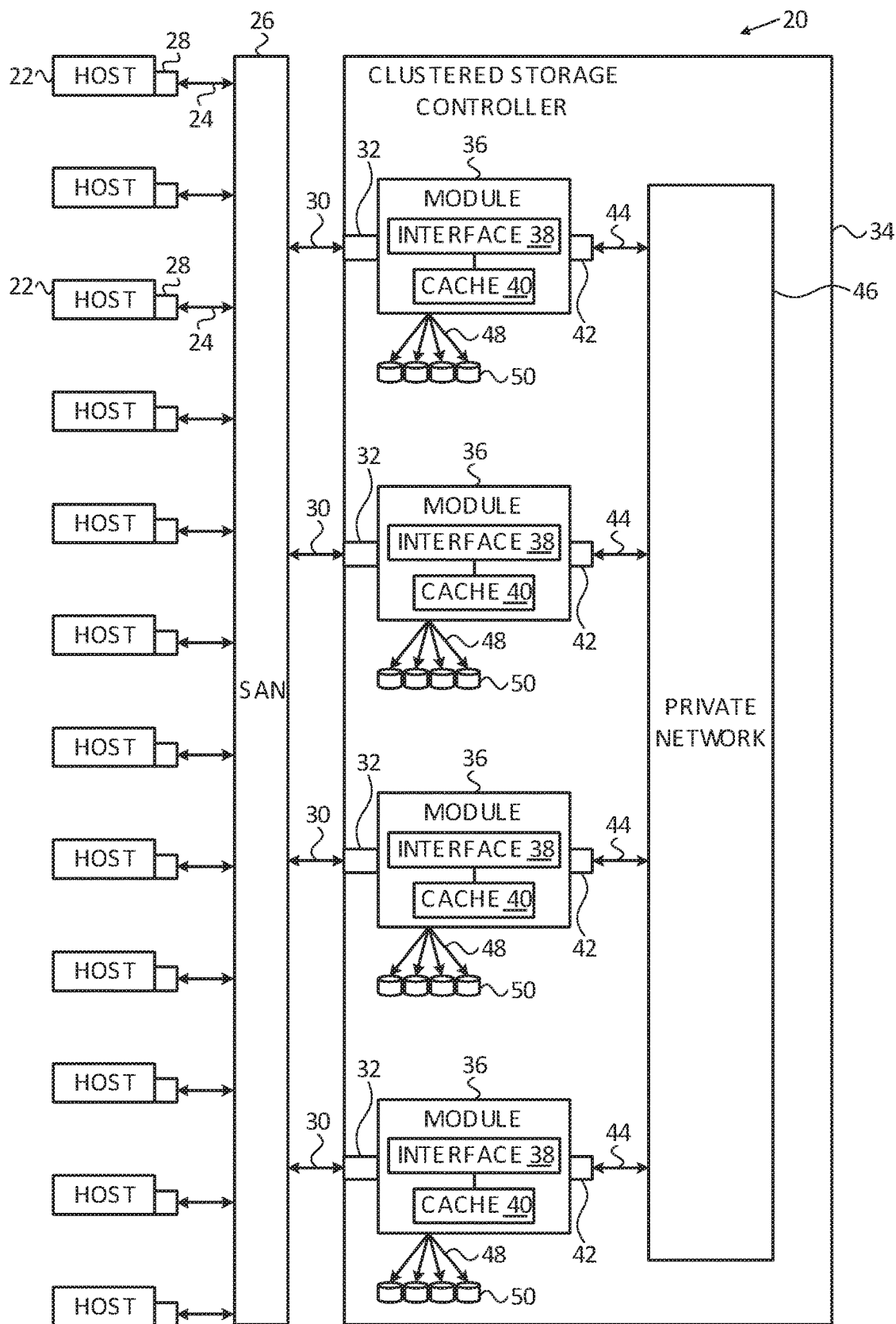
FIG. 1 illustrates a block diagram of a computer storage environment in which aspects of the present invention may be realized.

As previously mentioned, when executing a job with many tasks (or phases), the job will request resources from the resource scheduler of the cluster, and run the tasks on the resources allocated to the job by the scheduling manager of the cluster. When requesting resources, the resource requirement for tasks within the same job is equal for all tasks. The resource requirement consists of a resource unit (e.g., 1 central processing unit (CPU) and 2 gigabytes (GB) of memory), and the number of resource units needed. The resource scheduler or scheduling manager will then allocate some or all of the requested resource units to the job for executing the tasks.

However, this resource unit is currently to be specified by the user, and as aforementioned, when executing, different applications have different resource requirements and some applications have differing resource requirements for various tasks or phases of the job. Hence, it is difficult for the user to determine an accurate value of resource units to specify for executing the job to the resource scheduler, as even small discrepancies in resource units specified by the user as opposed to what resources (and number of resource units thereof) are actually needed/used by the job can create bottlenecks or resource wastage in the system.

For example, consider a user specified resource unit to be 1 CPU and 2 GB of memory, however the task only needs 0.8 (resource units) of the CPU and 1 GB of memory. In this situation, since the resources (or at least portions thereof) are allocated specifically for the task at hand, some or all of the resources are wasted as they are not fully utilized. Likewise, if the task requires 1.5 (resource units) of CPU resources and 3 GB of memory, the resources are then overloaded, which causes bottlenecking and other complications. Perhaps a more important consideration than the wasted/overloaded resources allocated to only the task at hand, however, is that when compounded throughout the computing cluster, this resource wastage (or resource overloading) significantly decreases the efficiency of the overall cluster by allocating unneeded resource units to tasks which could otherwise be used elsewhere for additional tasks throughout the cluster.

There currently exist some resource schedulers like Apache YARN™ and Mesos™ that can adjust the resource unit(s) in the resource requirement allocated to particular jobs, but neither provide a mechanism to change or adjust the resource unit dynamically based on the actual resource usage of executing jobs. Likewise, there exist implementations (e.g., dynamic programming algorithm, Hungarian method) for allocating resources dynamically, but each of these mechanisms focus on allocating resources in data centers or other systems based on known resource units, the target of which is to fully utilize the resources such that many workloads can run simultaneously. None of these methods, however, propose changing the resource unit dynamically based on the actual resource usage of each task in the running job. For example, when using these previous solutions with a host having 4 CPUs and 4 GB of memory, one task may be assigned a resource unit of 1 CPU and 3 GB of memory, and one task with a resource unit of 3 CPUs and 1 GB of memory, to ensure the resources of the host are fully used. Nonetheless, these implementations, again, do not take in to account the actual resource usage of running workloads within the system (and dynamically adjust them in real time).

Accordingly, the present invention considers methods and systems to more efficiently optimize and utilize resources in distributed computing environments. These mechanisms include such functionality as, when allocating resource units in a resource requirement for a particular job, dynamically (in real time) changing the resource units by the resource scheduler based on resource usage information of running tasks or history records associated with previous instances of the task(s) of the particular job. The resource scheduler can obtain a "preferred resource unit(s)" for the particular job and respective tasks associated therewith based on maximum or average resource usages of resources used to execute the running tasks as defined in resource usage history records. Configurable buffers of resources may additionally be allocated (such as allocating 20% more of a given resource or resource unit than actual usage suggests should be allocated) to ensure that enough resources are available to the job to execute the tasks efficiently. Other matrixes and algorithms can be developed to handle different types of jobs and the resource unit in the resource requirement thereof may be adjusted dynamically based on the preferred resource unit for the given job. Additionally, the resource unit of allocated resources for currently running tasks of the particular job can also be updated in real time.

Further, the present invention employs functionality to prevent overloading of currently used resources by recognizing jobs in which the executing tasks thereof require more resources than are currently allocated to execute properly. Additional available resources may be allocated to these tasks, or low-priority tasks of the job (or other jobs) may be reclaimed to free resources thereby easing the bottleneck of the system. These and additional aspects of the present invention and attendant benefits will be further described, following.

It should be noted that the instant disclosure, for brevity, frequents the language of "resources". In an actual implementation of the present invention, the resources termed herein may be comprised of CPUs, graphical processing units (GPUs), memory, storage devices, network devices, accelerator devices, or even entire computing nodes. Indeed, any hardware and/or software resources as commonly known in the art are to be construed interchangeably with "resources" or "resource types" as described herein, as one practicing the art would appreciate.

Turning now to FIG. 1, a schematic pictorial illustration of a data processing storage subsystem 20 is shown, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, Input/Output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally, or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While not explicitly shown for purposes of illustrative simplicity, the skilled artisan will appreciate that in some embodiments, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Figure 2:
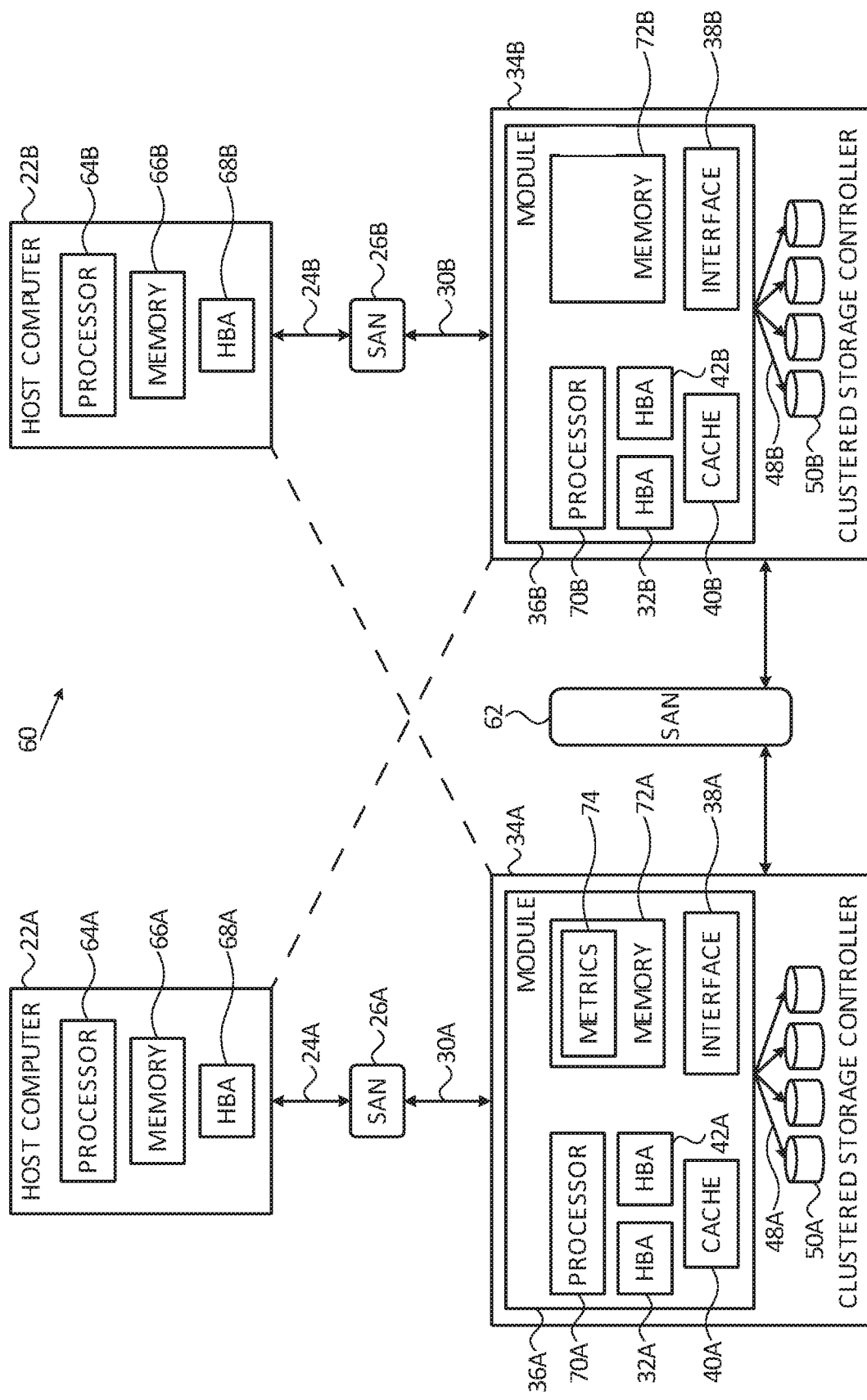
FIG. 2 illustrates a block diagram of a hardware structure of a data storage system in which aspects of the present invention may be realized.

FIG. 2 is a schematic pictorial illustration of facility 60 configured to perform host computer monitoring, in accordance with an embodiment of the present invention. In the description herein, host computers 22, storage controllers 34 and their respective components may be differentiated by appending a letter to the identifying numeral, so that facility 60 comprises a first host computer 22A (also referred to herein as a primary host computer) coupled to a clustered storage controller 34A via a SAN 26A, and a second host computer 22B (also referred to herein as a secondary host computer) coupled to a clustered storage controller 34B via a SAN 26B. In the configuration shown in FIG. 2 storage controllers 34A and 34B are coupled via a facility SAN 62. In other embodiments, as will be described herein, the first host computer 22A may be directly connected to the clustered storage controller 34B, and the second host computer 22B may be directly connected to the clustered storage controller 34A via a SAN similar to SAN 62, a virtualized networking connection, or any other computer implemented medium.

Host computer 22A comprises a processor 64A, a memory 66A, and an adapter 68A. Adapter 68A is coupled to SAN 26A via a data connection 24A.

As described supra, module 36A is coupled to storage devices 50A via data connections 48A, and comprises adapters 32A and 42A, a cache 40A, and an interface 38A.

Module 36A also comprises a processor 70A and a memory 72A. As explained in detail hereinbelow, processor 70A is configured to establish metrics 74 that indicate a connectivity status of host computer 22A, and store the metrics to memory 72A. In some embodiments, processor 70A may store metrics 74 to storage devices 50A.

Host computer 22B comprises a processor 64B, a memory 66B, and an adapter 68B. Adapter 68B is coupled to SAN 26B via a data connection 24B.

As described supra, module 36B is coupled to storage devices 50B via data connections 48B, and comprises adapters 32B and 42B, a cache 40B, and an interface 38B. Module 36B also comprises a processor 70B and a memory 72B.

Processors 64A, 64B, 70A and 70B typically comprise general-purpose computers, which are programmed in software to carry out the functions described herein. The software may be downloaded to host computers 22A and 22B and modules 36A and 36B in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

Examples of adapters 32A, 32B, 42A, 42B, 68A and 68B, include switched fabric adapters such as Fibre Channel (FC) adapters, Internet Small Computer System Interface (iSCSI) adapters, Fibre Channel over Ethernet (FCoE) adapters and Infiniband™ adapters.

While the configuration shown in FIG. 2 shows storage host computers 22A and 22B coupled to storage controllers 34A and 34B via SANs 26A and 26B, other configurations are to be considered within the spirit and scope of the present invention. For example, host computers 22A and 22B can be coupled to a single storage controller 34 via a single SAN 26.

It is further understood in advance that although this disclosure includes a detailed description on cloud computing, following, that implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes and storage systems (e.g. storage subsystem 20).

Figure 3:
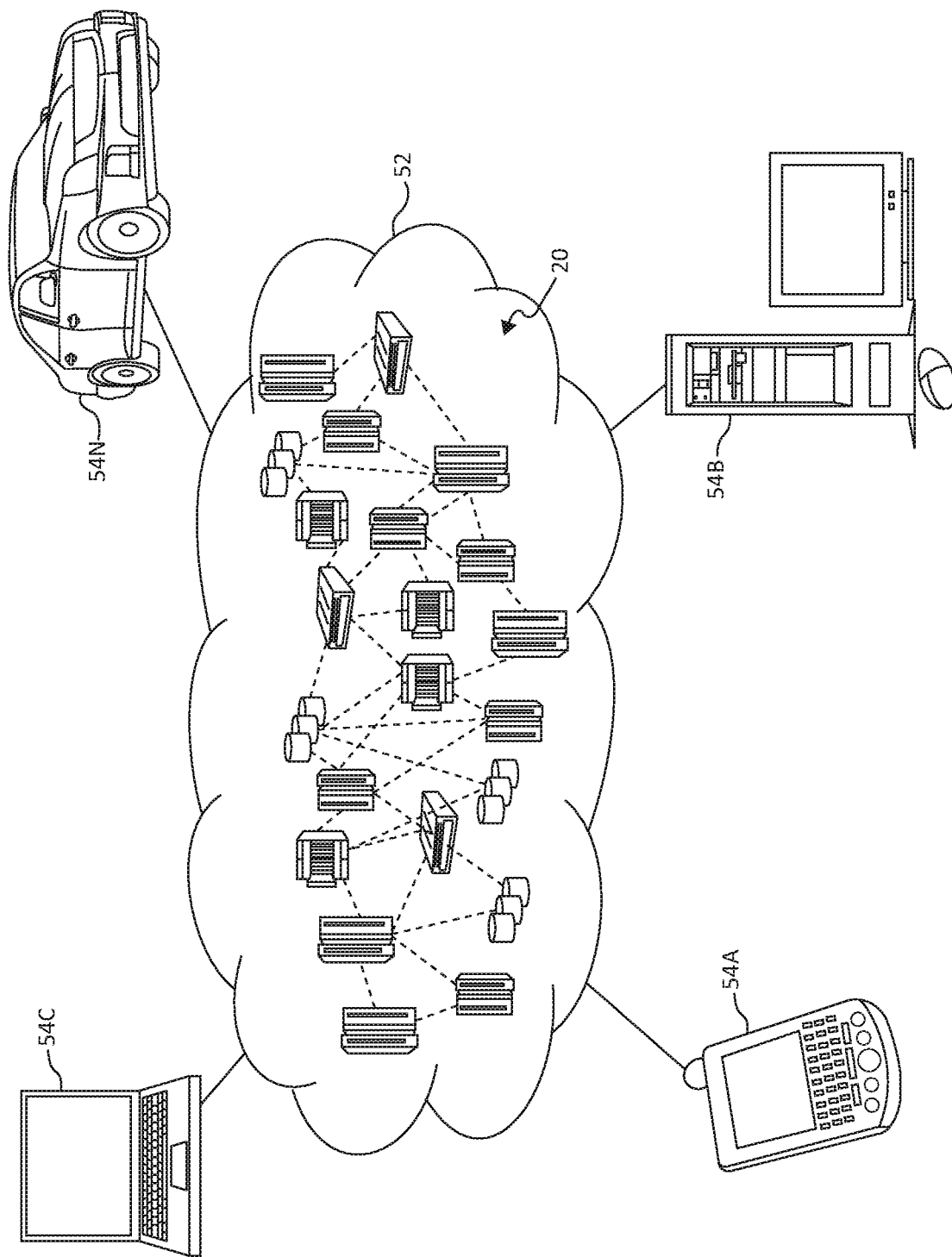
FIG. 3 illustrates a block diagram of an exemplary cloud computing environment according to embodiments of the present invention.

Referring now to FIG. 3, illustrative cloud computing environment 52 is depicted. As shown, cloud computing environment 52 comprises one or more storage subsystems 20 and cloud computing nodes with which local computing devices used by cloud consumers, such as, for example, personal digital assistant (PDA) or cellular telephone 54A, desktop computer 54B, laptop computer 54C, and/or automobile computer system 54N may communicate. Storage systems 20 and the cloud nodes may communicate with one another. They may be grouped (not shown) physically or virtually, in one or more networks, such as Private, Community, Public, or Hybrid clouds as described hereinabove, or a combination thereof. This allows cloud computing environment 52 to offer infrastructure, platforms and/or software as services for which a cloud consumer does not need to maintain resources on a local computing device. It is understood that the types of computing devices 54A-N shown in FIG. 3 are intended to be illustrative only and that storage subsystems 20, cloud computing nodes and cloud computing environment 52 can communicate with any type of computerized device over any type of network and/or network addressable connection (e.g., using a web browser).

Figure 4:
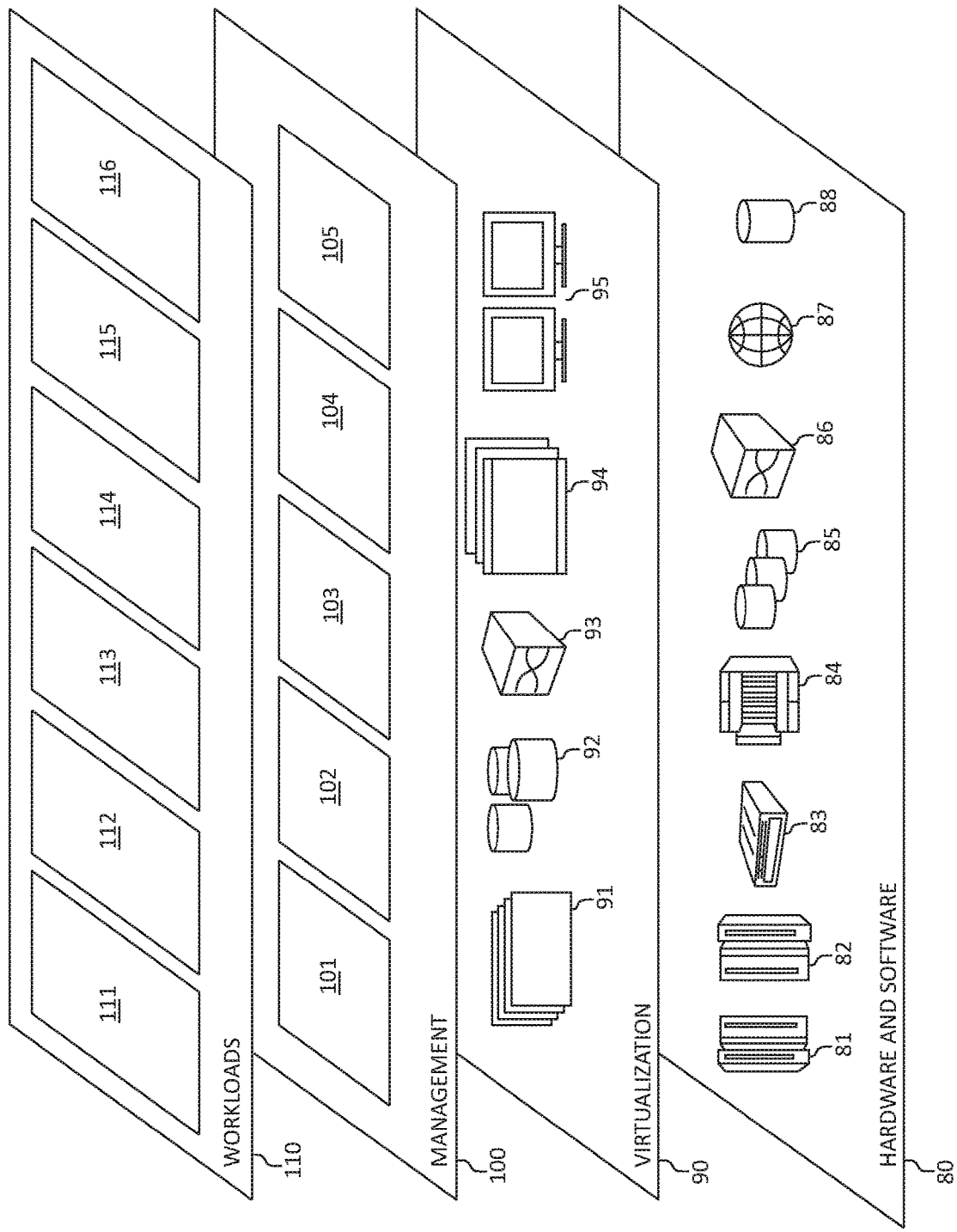
FIG. 4 illustrates a block diagram depicting abstraction model layers according to embodiments of the present invention.

Referring now to FIG. 4, a set of functional abstraction layers provided by cloud computing environment 52 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 80 includes hardware and software components. Examples of hardware components include: mainframes 81; RISC (Reduced Instruction Set Computer) architecture based servers 82; servers 83; blade servers 84; storage devices 85; and networks and networking components 86. In some embodiments, software components include network application server software 87 and database software 88.

Virtualization layer 90 provides an abstraction layer from which the following examples of virtual entities may be provided: virtual servers 91; virtual storage 92; virtual networks 93, including virtual private networks; virtual applications and operating systems 94; and virtual clients 95.

In one example, management layer 100 may provide the functions described below. Resource provisioning 101 provides dynamic procurement of computing resources and other resources that are utilized to perform tasks within the cloud computing environment. Metering and Pricing 102 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 103 provides access to the cloud computing environment for consumers and system administrators. Service level management 104 provides cloud computing resource allocation and management such that required service levels are met. Service Level Agreement (SLA) planning and fulfillment 105 provides pre-arrangement for, and procurement of, cloud computing resources for which a future requirement is anticipated in accordance with an SLA.

Workloads layer 110 provides examples of functionality for which the cloud computing environment may be utilized. Examples of workloads and functions which may be provided from this layer include: mapping and navigation 111; software development and lifecycle management 112; virtual classroom education delivery 113; data analytics processing 114; transaction processing 115; and, in the context of the illustrated embodiments of the present invention, various data security workloads and functions 116, such as antivirus scanning workloads, or anti-malware scanning workloads. In addition, data security workloads and functions 116 may include such operations as data quarantining and/or data deleting functions. One of ordinary skill in the art will appreciate that the data security workloads and functions 116 may also work in conjunction with other portions of the various abstractions layers, such as those in hardware and software 80, virtualization 90, management 100, and other workloads 110 (such as data analytics processing 114, for example) to accomplish the various purposes of the illustrated embodiments of the present invention.

Figure 5A:
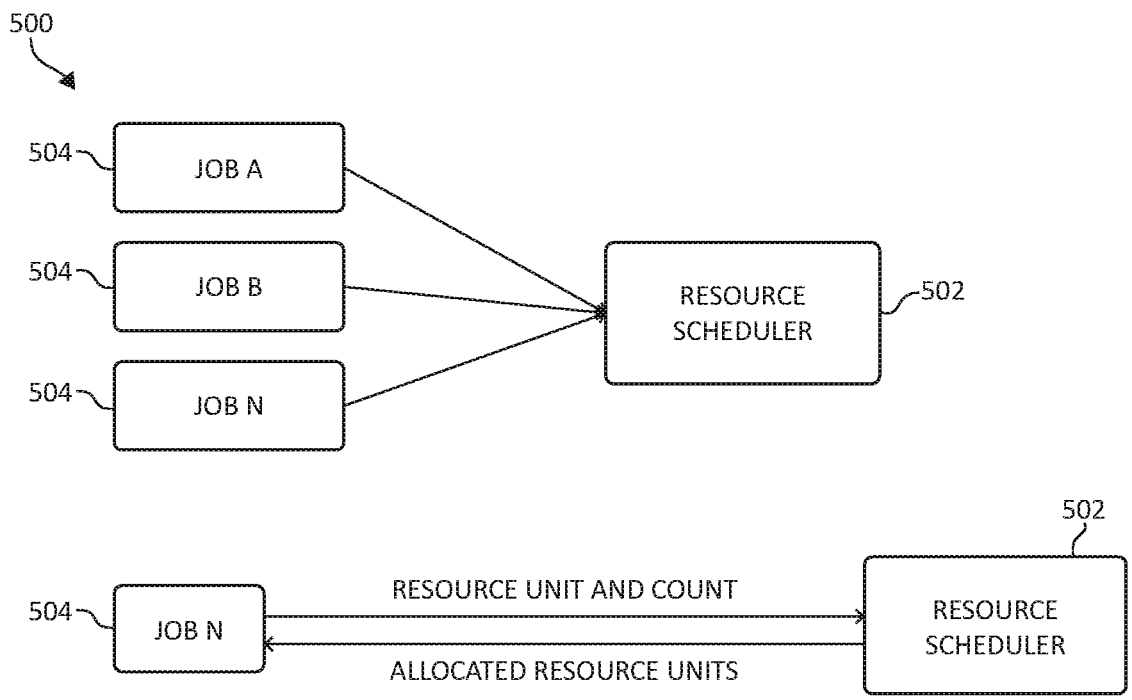
FIG. 5A illustrates a block diagram of a resource scheduler in a computing cluster, in accordance with aspects of the present invention.

Continuing, and by way of further background, FIG. 5A illustrates a block diagram 500 of a resource scheduler in a computing cluster, in accordance with aspects of the present invention. For executing one or more jobs (labeled as job A, job B, and job N—or collectively referred to as job(s) 504), the resource scheduler 502 will receive a resource requirement from the job(s) 504 including a resource unit type (e.g., CPU/GPU/memory, etc.) from the job(s) 504, and allocate resource units accordingly.

Figure 5B:
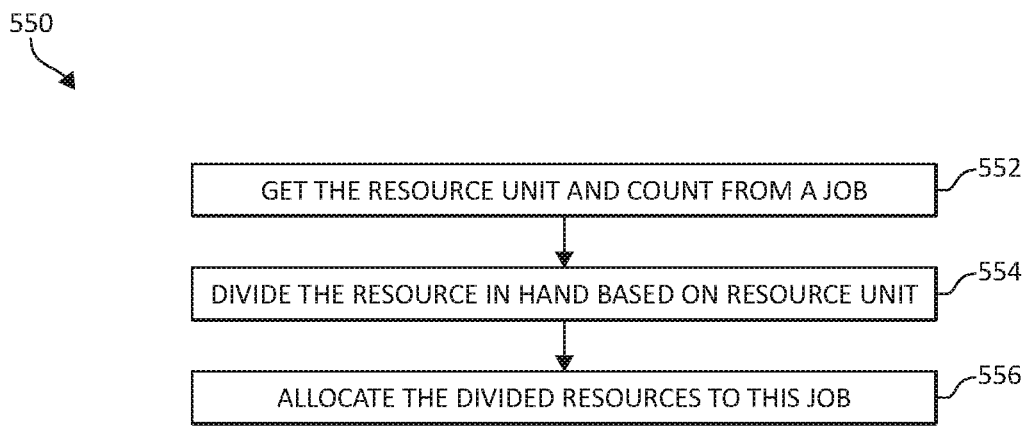
FIG. 5B illustrates a flowchart diagram illustrating a method for distributing resources in a distributed computing environment, in accordance with aspects of the present invention.

This allocation is currently performed as shown in FIG. 5B, which illustrates a flowchart diagram illustrating a method 550 for distributing resources in a distributed computing environment. As specified by a user in accordance with the job(s) 504, the resource requirement is received by the resource scheduler 502, including the resource unit type and count (or dimension) (step 552). The resource scheduler 502 then divides the resources in hand (or in other words, available resources ready to be allocated) based on the resource unit/count requirement requested by the job(s) 504 (step 554). The resource scheduler 502 finally allocates these divided resources to the job(s) 504 for execution of the tasks within the respective job(s) 504 (step 556).

However, as aforementioned, within the process performed in method 550, the user ultimately specifies which resource units and counts (or dimensions) thereof are allocated to the task(s) of the job(s) 504. Thus implements the functionality of the present invention which provides the ability for the resource units and dimensions thereof to be dynamically changed, by the resource scheduler 502, based on actual resource usage of the job(s) 504 as associated with current resource monitoring and resource usage history information obtained from the job(s) 504. This current resource usage monitoring and resource usage history information is collected to establish the preferred resource unit metric when performing the same or similar task(s) related to the respective job(s) 504.

For example, when implementing the functionality taught herein, consider the resource unit specified by the user (or the default configuration) is set to 1 CPU and 2 GB of memory, and the preferred resource unit for a particular job of the job(s) 504 is 0.8 CPU and 3 GB of memory. In this instance, the resource scheduler 502 will recognize the particular job and preferred resource unit thereof based on its usage history information, and change the resource unit for the job to 0.8 CPU and 3 GB of memory. Respective resources are then allocated to the particular job based on this new resource unit (preferred resource unit). Currently running task(s) of the respective job will also be updated with a resource unit dimension of 0.8 CPU and 3 GB of memory. Therefore, 0.2 CPU resource units will be released and 1 GB more memory will be dynamically (in real time) assigned to these task(s).

Because the resource unit can be changed dynamically by the detected resource usage of currently executing task(s) as pursuant to the resource request, not only will the existing resource unit be modified as per the actual usage of the resources of the currently running task(s), but also the resource units for future requests of these task(s) of the job(s) 504. Therefore, tasks of the job(s) 504 will run on only suitable resources needed to perform the given task(s) (within a configurable allocated resource buffer), which more efficiently distributes the resources of the cluster without overloading or wasting said resources.

Consider another example of a host having 4 CPUs and 8 GB of memory, where the resource unit specified by the user is 1 CPU and 2 GB of memory, and in which there will be 4 tasks (4*[1 CPU, 2 GB memory]=[4 CPU, 8 GB memory]) running on this host by current design. If these tasks actually need only 0.8 CPU resource units and 1.6 GB memory to execute, then an additional task can be added to run concurrently using the same amount of originally allocated resources (5 tasks at 5*[0.8 CPU, 1.6 GB memory]=[4 CPU, 8 GB memory]) on this host, which provides a performance improvement of 25% (5/4−1), when the resource(s) are fully utilized.

Conversely and by the same example, if a task actually requires more resources of 2 CPU and 4 GB of memory to execute properly, then instead of running all 4 tasks, the host is only suitably allocated resources to handle 2 of these tasks (2*[2 CPU, 4 GB memory]=[4 CPU, 8 GB memory]). Therefore, the resources allocated to this particular host are overloaded, which causes bottlenecking and performance issues alike. Accordingly, and using the additional mechanisms of the present invention, the resource overload in the aforementioned example will only occur for a limited period before the system detects the issue. Once the system detects the tasks that are running actually overload the resources allocated to the host to perform the job, 2 of these tasks will be reclaimed to balance the tasks and their associated resource requirement, and future tasks of this type will be commenced on resources of the updated resource unit (the preferred resource unit) of the larger dimension.

Figure 6:
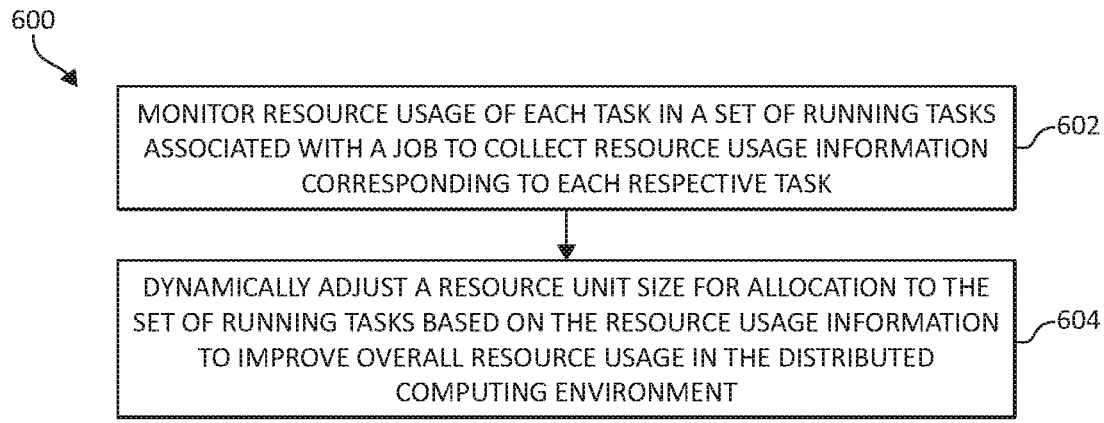
FIG. 6 illustrates a flowchart diagram illustrating an exemplary method for optimizing resource usage in a distributed computing environment, by which aspects of the present invention may be implemented.

FIG. 6 illustrates this functionality by describing an exemplary method 600 for optimizing resource usage in a distributed computing environment, in accordance with one embodiment of the present invention. The method 600 may be performed in accordance with the present invention in any of the environments depicted in FIGS. 1-4, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

The method 600 begins by monitoring resource usage of each task in a set of running tasks associated with a job (e.g., job(s) 504) to collect resource usage information corresponding to each respective task (step 602). A resource unit size of at least one resource allocated to respective tasks in the set of running tasks is dynamically adjusted based on the resource usage information to improve overall resource usage in the distributed computing environment (step 604). The method 600 ends.

Figure 7:
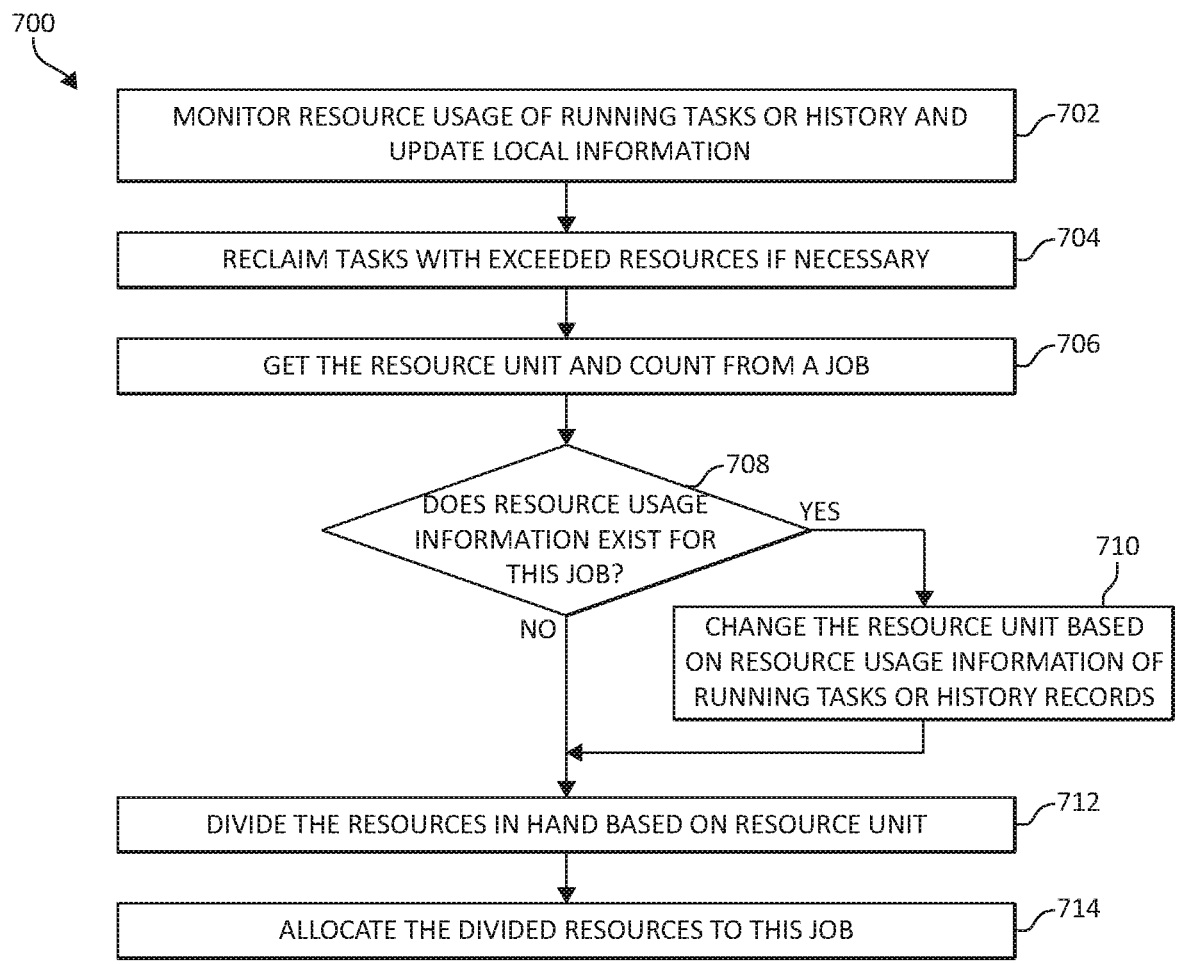
FIG. 7 illustrates an additional flowchart diagram illustrating an exemplary method for optimizing resource usage in a distributed computing environment, by which aspects of the present invention may be implemented.

FIG. 7 illustrates an additional exemplary method 700 for optimizing resource usage in a distributed computing environment, in accordance with one embodiment of the present invention. The method 700 may be performed in accordance with the present invention in any of the environments depicted in FIGS. 1-4, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

The method 700 begins with the resource scheduler 502 monitoring the resource usage of running task(s) of job(s) 504. The resource usage associated with each running task within the job(s) 504 will be updated locally as job-corresponding usage history information (step 702). In this step, the resource usage of the scheduled dimension or resource count of the resource type (e.g., CPU, memory, etc.) will be collected, and is extensible to other dimensions so long as the user is able to collect the usage of the resource unit provided by an out-of-box method (an interface may additionally be provided such that the user may easily plugin the collection of the usage information to the out-out-box method).

Even if one dimension of resource usage by the running task(s) is not able to be collected for technical limitations, the methods proposed herein still optimize those dimensions that can. For a dimension (or in other words, the resource unit and count), the average usage of each resource used by the running task(s) of job(s) 504 will be used by default. To avoid resource overuse or reduce the frequency of reclaiming tasks, the maximum usage of the actual usage of the task(s) of job(s) 504 and/or a buffer of an additional amount of resources may also be used pursuant to the resource dimension or resource unit and count.

For updating the resource usage history information, if job(s) 504 are long running workload(s) (as determined corresponding to a predetermined time period or complexity), the usage information will be updated based on the running task(s) thereof after the task(s) have begun executing for some time (e.g., a predetermined amount of time). If job(s) 504 are short running workload(s) (as determined corresponding to the predetermined time period or complexity), the resource usage history information associated with the updated local information will be used.

Returning to step 704, to avoid overloading the host, a mechanism, such as control groups in Linux (cgroups), may be applied to limit the actual resource usage of the task(s) of job(s) 504. For example, if a particular running task utilizes more than the preferred resource unit established in the resource usage history information, the system may choose to increase the amount of resources or resource units thereof to the particular task if such resources are available for use. Otherwise, other low-priority tasks are terminated and reclaimed to free the resources used by the low-priority tasks (step 704). Additionally, tasks of the same job (of job(s) 504) that are starting to execute on the same hosts may share a resource limit, such that the system only limits the total usages of resources for all tasks of the same job collectively, instead of individually.

At step 706, the resource requirement is received by the resource scheduler 502, including the resource unit type and count for an associated one of the job(s) 504. At step 708, a determination is made by the resource scheduler 502 as to whether there exists resource usage history information for the particular job(s) 504. If no resource usage history information is available for the particular one of the job(s) 504, the resource scheduler 502 then uses either the user defined or default resource unit dimension (resource unit type, size, and count) to allocate resources to the particular job(s) 504, and divides the resources in hand (or in other words, available resources ready to be allocated) based on the resource unit/count requested by the particular job(s) 504 (step 712). The resource scheduler 502 allocates these divided resources to the job(s) 504 for execution of the tasks within the particular job(s) 504 (step 714), and the usage information associated with each task of the particular job(s) 504 is monitored and updated locally in the resource usage history information, as in step 702.

Returning to step 708, again, when the resource scheduler 502 receives the resource requirement from the particular job(s) 504, the resource scheduler 502 will first check if the resource usage information exists, and if it is determined that resource history information exists for the particular job(s) 504, the resource unit and dimension (resource unit, size, count) is updated in the resource scheduler 502 for the particular job(s) 504 prior to the resource scheduler 502 scheduling the particular job(s) 504 for execution (step 710). Once the resource unit and dimension is updated in accordance with the resource usage history information for the particular job(s) 504, the resource unit and dimension for currently running tasks corresponding to the particular job(s) 504 may also be updated immediately, in which case the running tasks will receive or release resources commensurate with the new resource unit (preferred resource unit) provided by the resource scheduler 502 for the particular job(s) 504.

The resource scheduler 502 then divides the resources in hand (available resources ready to be allocated) based on the resource unit/count requested by the particular job(s) 504 (step 712), and allocates these divided resources to the job(s) 504 for execution of the task(s) within the particular job(s) 504 (step 714). The usage information associated with each of the task(s) of the particular job(s) 504 is monitored while the task(s) therein are executing, and the resource usage information is updated locally in the resource usage history information of the resource scheduler 502, as in step 702.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for optimizing resource usage in a distributed computing environment, the distributed computing environment comprising a computing cluster having a plurality of nodes and a resource scheduler, the method comprising:
receiving, by the resource scheduler, a resource requirement for performing a job, the resource requirement specifying a resource type and a resource unit size of the resource type anticipated to be needed to perform the job, wherein the resource scheduler schedules execution of the job by mapping a set of running tasks of the job to corresponding resources distributed amongst the plurality of nodes of the computing cluster in the distributed computing environment;
dividing, by the resource scheduler, available resources based on the resource unit size of the resource type specified in the resource requirement;
allocating, by the resource scheduler, the divided resources to the job for execution of each task in the set of running tasks associated with the job according to the resource requirement, wherein the job is commenced responsive to the allocation;
responsive to commencing the job, monitoring, by the resource scheduler, resource usage of each task in the set of running tasks associated with the job to collect resource usage information corresponding to each respective task, wherein the set of running tasks are each distributed across respective nodes of the plurality of nodes of the computing cluster to collectively perform the job;
dynamically adjusting, by the resource scheduler, the resource unit size of at least one resource of the resource type allocated to respective tasks in the set of running tasks, irrespective of which of the plurality of nodes the respective tasks are executing within, based on the resource usage information, wherein dynamically adjusting the resource unit size includes allocating, during the adjusting and specific to each resource type, a specified additional amount of the at least one resource to the respective tasks than suggested by the resource usage information as a configurable buffer to ensure execution of the respective tasks;
updating the resource requirement specifically within the resource scheduler based on observation of the adjustment of the resource unit size of the at least one resource of the resource type allocated to the respective tasks in the set of running tasks of the job; and
responsive to receiving a new resource requirement with a request to perform the job in a subsequent execution and determining the resource usage for the job is available, dynamically adjusting the resource unit size for each of the respective tasks by overriding the received new resource requirement, wherein an allocation of resources is scheduled to each of the respective tasks based on the resource usage prior to initiating a performance of the job for the subsequent execution, and wherein:
when the job is a long-running job as determined according to an execution period of the job surpassing a first predetermined time threshold, the resource unit size required to perform the job is updated in the resource usage information subsequent to performing the monitoring of the resource usage of the respective tasks for longer than a second predetermined time threshold; and
when the job is a short-running job as determined according to the execution period of the job failing to surpass the first predetermined time threshold, the resource unit size specified in the resource usage information is used to perform the allocation of resources to each of the respective tasks based on identified characteristics of previously executed instances of the job and without updating the resource usage information.

2. The method of claim 1, wherein monitoring the resource usage further includes updating local information including a usage history associated with each of the respective tasks in the set of running tasks.

3. The method of claim 2, further including, upon receiving the resource requirement, determining whether the usage history for the job exists; and
responsive to determining the usage history for the job exists, adjusting, from a default allocation, the resource unit size for the job according the usage history; wherein the resource unit size is updated prior to scheduling the job by the resource scheduler.

4. The method of claim 3, further including, responsive to determining the usage history for the job does not exist, using either the default allocation or a user-specified allocation of the resource unit size of the at least one resource allocated to the job.

5. The method of claim 3, further including, responsive to updating the resource unit size prior to scheduling the job by the job scheduler, adjusting the resource unit size of the at least one resource allocated to the respective tasks within the set of running tasks currently using the at least one resource receiving the updated resource unit size.

6. The method of claim 1, further including determining whether a particular task in the set of running tasks exceeds a predetermined threshold of resource consumption by the at least one allocated resource.

7. The method of claim 6, further including, when the particular task in the set of running tasks exceeds the predetermined threshold of resource consumption, performing:
increasing the resource unit size of the at least one resource allocated to the particular task if additional resources are available; or
reclaiming the particular task thereby freeing the at least one resource allocated to the particular task.

8. A system for optimizing resource usage in a distributed computing environment, the distributed computing environment comprising a computing cluster having a plurality of nodes and a resource scheduler, the system comprising:
a processor device executing instructions stored in a memory, wherein the processor device:
receives a resource requirement for performing a job by the resource scheduler, the resource requirement specifying a resource type and a resource unit size of the resource type anticipated to be needed to perform the job, wherein the resource scheduler schedules execution of the job by mapping a set of running tasks of the job to corresponding resources distributed amongst the plurality of nodes of the computing cluster in the distributed computing environment;
divides available resources based on the resource unit size of the resource type specified in the resource requirement;
allocates the divided resources to the job according to the resource requirement for execution of each task in the set of running tasks associated with the job, wherein the job is commenced responsive to the allocation;
responsive to commencing the job, monitors resource usage of each task in the set of running tasks associated with the job to collect resource usage information corresponding to each respective task, wherein the set of running tasks are each distributed across respective nodes of the plurality of nodes of the computing cluster to collectively perform the job; and
dynamically adjusts the resource unit size of at least one resource of the resource type allocated to respective tasks in the set of running tasks, irrespective of which of the plurality of nodes the respective tasks are executing within, based on the resource usage information, wherein dynamically adjusting the resource unit size includes allocating, during the adjusting and specific to each resource type, a specified additional amount of the at least one resource to the respective tasks than suggested by the resource usage information as a configurable buffer to ensure execution of the respective tasks;
updates the resource requirement specifically within the resource scheduler based on observation of the adjustment of the resource unit size of the at least one resource of the resource type allocated to the respective tasks in the set of running tasks of the job; and
responsive to receiving a new resource requirement with a request to perform the job in a subsequent execution and determining the resource usage for the job is available, dynamically adjusts the resource unit size for each of the respective tasks by overriding the received new resource requirement, wherein and scheduling an allocation of resources is scheduled to each of the respective tasks based on the resource usage prior to initiating a performance of the job for the subsequent execution, and wherein:
when the job is a long-running job as determined according to an execution period of the job surpassing a first predetermined time threshold, the resource unit size required to perform the job is updated in the resource usage information subsequent to performing the monitoring of the resource usage of the respective tasks for longer than a second predetermined time threshold; and
when the job is a short-running job as determined according to the execution period of the job failing to surpass the first predetermined time threshold, the resource unit size specified in the resource usage information is used to perform the allocation of resources to each of the respective tasks based on identified characteristics of previously executed instances of the job and without updating the resource usage information.

9. The system of claim 8, wherein monitoring the resource usage further includes updating local information including a usage history associated with each of the respective tasks in the set of running tasks.

10. The system of claim 9, wherein the processor device, upon receiving the resource requirement, determines whether the usage history for the job exists; and
responsive to determining the usage history for the job exists, adjusts, from a default allocation, the resource unit size for the job according the usage history; wherein the resource unit size is updated prior to scheduling the job by the resource scheduler.

11. The system of claim 10, wherein the processor device, responsive to determining the usage history for the job does not exist, uses either the default allocation or a user-specified allocation of the resource unit size of the at least one resource allocated to the job.

12. The system of claim 10, wherein the processor device, responsive to updating the resource unit size prior to scheduling the job by the job scheduler, adjusts the resource unit size of the at least one resource allocated to the respective tasks within the running set of running tasks currently using the at least one resource receiving the updated resource unit size.

13. The system of claim 8, wherein the processor device determines whether a particular task in the set of running tasks exceeds a predetermined threshold of resource consumption by the at least one allocated resource.

14. The system of claim 13, wherein the processor device, when the particular task in the set of running tasks exceeds the predetermined threshold of resource consumption, performs:

increasing the resource unit size of the at least one resource allocated to the particular task if additional resources are available; or reclaiming the particular task thereby freeing the at least one resource allocated to the particular task.

15. A computer program product for optimizing resource usage in a distributed computing environment, the distributed computing environment comprising a computing cluster having a plurality of nodes and a resource scheduler, the computer program product embodied on a non-transitory computer-readable storage medium having computer-readable program code portions stored therein, the computer-readable program code portions comprising:

an executable portion that receives a resource requirement for performing a job by the resource scheduler, the resource requirement specifying a resource type and a resource unit size of the resource type anticipated to be needed to perform the job, wherein the resource scheduler schedules execution of the job by mapping a set of running tasks of the job to corresponding resources distributed amongst the plurality of nodes of the computing cluster in the distributed computing environment;

an executable portion that divides, by the resource scheduler, available resources based on the resource unit size of the resource type specified in the resource requirement;

an executable portion that allocates, by the resource scheduler, the divided resources to the job for execution of each task in the set of running tasks associated with the job according to the resource requirement, wherein the job is commenced responsive to the allocation;

an executable portion that, responsive to commencing the job, monitors resource usage of each task in the set of running tasks associated with the job to collect resource usage information corresponding to each respective task, wherein the set of running tasks are each distributed across respective nodes of a plurality of nodes of a computing cluster to collectively perform the job; and an executable portion that dynamically adjusts the resource unit size of at least one resource of the resource type allocated to respective tasks in the set of running tasks, irrespective of which of the plurality of nodes the respective tasks are executing within, based on the resource usage information, wherein dynamically adjusting the resource unit size includes allocating, during the adjusting and specific to each resource type, a specified additional amount of the at least one resource to the respective tasks than suggested by the resource usage information as a configurable buffer to ensure execution of the respective tasks;

an executable portion that updates the resource requirement specifically within the resource scheduler based on observation of the adjustment of the resource unit size of the at least one resource of the resource type allocated to the respective tasks in the set of running tasks of the job; and an executable portion that, responsive to receiving a new resource requirement with a request to perform the job in a subsequent execution and determining the resource usage for the job is available, dynamically adjusts the resource unit size for each of the respective tasks by overriding the received new resource requirement, wherein an allocation of resources is scheduled to each of the respective tasks based on the resource usage prior to initiating a performance of the job for the subsequent execution, and wherein:

when the job is a long-running job as determined according to an execution period of the job surpassing a first predetermined time threshold, the resource unit size required to perform the job is updated in the resource usage information subsequent to performing the monitoring of the resource usage of the respective tasks for longer than a second predetermined time threshold; and when the job is a short-running job as determined according to the execution period of the job failing to surpass the first predetermined time threshold, the resource unit size is specified in the resource usage information is used to perform the allocation of resources to each of the respective tasks based on identified characteristics of previously executed instances of the job and without updating the resource usage information.

16. The computer program product of claim 15, wherein monitoring the resource usage further includes updating local information including a usage history associated with each of the respective tasks in the set of running tasks.

17. The computer program product of claim 16, further including an executable portion that, upon receiving the resource requirement, determines whether the usage history for the job exists; and an executable portion that, responsive to determining the usage history for the job exists, adjusts, from a default allocation, the resource unit size for the job according the usage history; wherein the resource unit size is updated prior to scheduling the job by the resource scheduler.

18. The computer program product of claim 17, further including an executable portion that, responsive to determining the usage history for the job does not exist, uses either the default allocation or a user-specified allocation of the resource unit size of the at least one resource allocated to the job.

19. The computer program product of claim 17, further including an executable portion that, responsive to updating the resource unit size prior to scheduling the job by the job scheduler, adjusts the resource unit size of the at least one resource allocated to the respective tasks within the set of running tasks currently using the at least one resource receiving the updated resource unit size.

20. The computer program product of claim 15, further including an executable portion that determines whether a particular task in the set of running tasks exceeds a predetermined threshold of resource consumption by the at least one allocated resource.

21. The computer program product of claim 20, further including an executable portion that, when the particular task in the set of running tasks exceeds the predetermined threshold of resource consumption, performs:

increasing the resource unit size of the at least one resource allocated to the particular task if additional resources are available; or reclaiming the particular task thereby freeing the at least one resource allocated to the particular task.

* * * * *